UNITED STATES PATENT OFFICE.

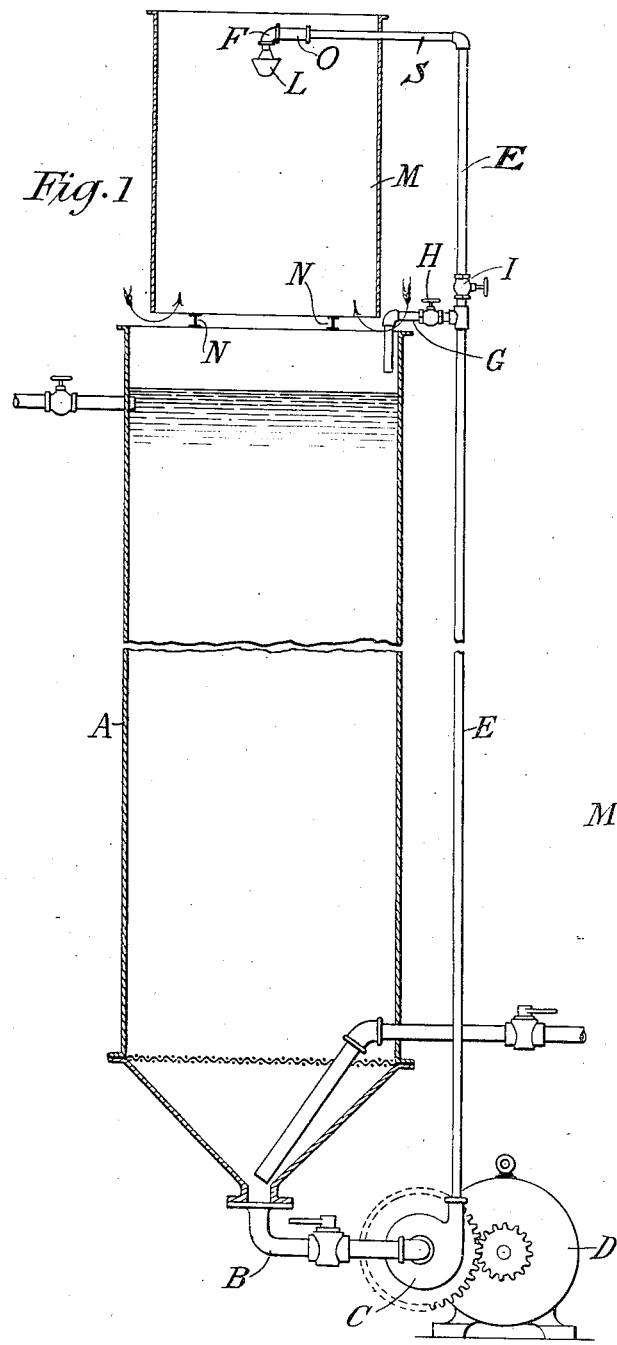
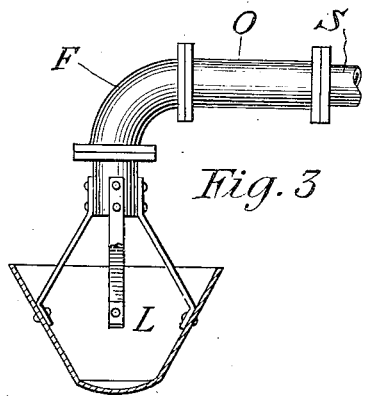
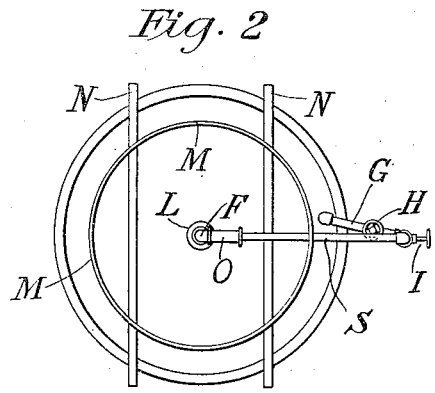

RALPH S. SHERWIN, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA.

COOLING APPARATUS FOR ALKALINE ALUMINATE SOLUTIONS.

1,251,295.     Specification of Letters Patent.     Patented Dec. 25, 1917.

Application filed July 16, 1913, Serial No. 779,328. Renewed April 17, 1917. Serial No. 162,756.

*To all whom it may concern:*

Be it known that I, RALPH S. SHERWIN, residing at East St. Louis, county of St. Clair, and State of Illinois, have invented certain new and useful Improvements in Cooling Apparatus for Alkaline Aluminate Solutions, of which the following is a full, clear, and exact description.

The invention which constitutes the subject-matter of this application relates to a cooling apparatus, and while the embodiment of the same, as herein shown, is specially designed for cooling alkaline aluminate solutions containing solid matter in suspension during precipitation it is not strictly limited to this use.

One of the methods now in vogue in the precipitation of aluminum hydrate from the solution commonly known in the art as sodium aluminate liquor consists, briefly, in establishing a column of the liquor, from which the hydrate is to be precipitated and in which is contained a quantity of precipitated hydrate in the form of fine particles, withdrawing precipitated hydrate from the lower part of the column and returning it to the upper part thereof, and continuing such withdrawal and return of hydrate while maintaining the column of liquor free from violent agitation whereby the precipitate collects in the lower portion of the column and is withdrawn therefrom with a minimum quantity of the liquor. The older practice consists, *inter alia*, in subjecting the liquor to agitation, more or less violent, by means of paddles, beaters, or similar devices working in the liquor, the prevalent belief being that more or less violent agitation was essential to accomplish the precipitation of the hydrate.

The apparatus herein described is an improvement upon prior constructions used in the precipitation of aluminum hydrate irrespective of the prior method adopted in promoting such precipitation. The essential feature of this invention consists in providing a novel apparatus by which the liquor can be subjected to a novel cooling process while undergoing precipitation and by which the precipitated hydrate, withdrawn from the bottom of the tank, can be exposed to the atmospheric air and reintroduced from a point above the center of the column of liquor while avoiding the formation of foam on the surface thereof. The reactions in the liquor are accompanied by the liberation of considerable heat and as a result the temperature of the liquor may reach a point where it seriously affects the rate of precipitation, especially in large units, in which the radiating surface of the apparatus is less in proportion to the cubic contents of the tank. Consequently, the precipitation is greatly augmented if the temperature be maintained below a given point and this is accomplished, in the apparatus shown, by breaking up the liquor into a finely divided state and exposing the same to atmospheric air. At the same time it is essential that the liquor be not cooled too fast. In fact the weather conditions may require that a large amount of the liquor be circulated through the cooling apparatus at one time and a small amount at another time. If the liquor is cooled too fast the hydrate obtained is much finer and precipitation does not take place as fully during the earlier period of circulation. Hence it is also one of the essential features of the invention to provide means for effectively regulating the rate of cooling of the liquor. Other features and advantages of the invention will appear from the detailed description of the preferred embodiment of the invention illustrated in the accompanying drawing, in which—

Figure 1 is a longitudinal vertical section of the precipitating tank with the cooler secured to the upper end thereof;

Fig. 2 is a top plan view thereof, and

Fig. 3 is an enlarged view of the distributer.

The vertical tank A, which may be cylindrical and which contains the sodium aluminate liquor, is provided with a conical or hopper bottom to the apex of which is connected a pipe B leading to a centrifugal pump C driven by a motor D to which it is geared. From the pump a circulating pipe E extends upwardly alongside the tank to a point above the surface of the liquor, then extends horizontally and terminates in an elbow F directed downwardly and located at a point some distance above the center of the precipitator. At G I show a branch pipe provided with a valve H whereby a portion or all of the liquor passing up the circulating pipe E may be discharged into the column of liquor at or adjacent the upper surface thereof. Beyond the branch pipe G a valve I is employed in the circulating pipe E for controlling (in conjunction with the valve H) the flow of the liquor carrying the precipitated hydrate to the cooler. A metallic saucer or distributer L of suitable size and which may be of the shape illustrated, or other suitable shape, is connected to the discharge end F of the circulating pipe so as to receive the liquor containing solid matter in suspension and which saucer is so shaped as to cause the said liquor to spread on all sides in a thin sheet which breaks up into fine particles as it falls. The liquor carrying the precipitated hydrate, broken up, as it is, by the distributer, is exposed, in falling from the said distributer to the precipitator, to the cooling action of the atmospheric air. A tower M of cylindrical or other suitable contour, according to the shape of the tank on which the apparatus is used, and with a diameter less than that of the precipitating tank, prevents the liquor discharged from the distributer from being thrown over the upper edge of the precipitator. Between the top of the precipitator and the bottom of the tower or cylinder I provide a space to allow the air to enter and circulate upwardly through the cylinder to cool the liquor discharged from the circulating pipe.

The distributer L, which receives and spreads the liquor, must be high enough above the upper surface of the column in the precipitator to cause the liquor discharged into said distributer to separate into fine particles before it finally enters the liquor in the precipitating tank. If the distributer is located too close to the upper surface of the liquor, or if for any reason the stream of liquor does not break up sufficiently, it will cause the liquor in the tank to foam and run over the sides of the precipitator. The size and shape of the distributer is such as to give the best and most uniform distribution of the liquor within the area inclosed by the tower, and the amount of liquor passing through the circulating pipe, and hence the distributer, may be varied, as before suggested, by manipulating the valve I, according to the rate of cooling desired. I prefer to have the liquor, which circulates through the cooling tower, all broken up into fine particles before the same reaches the bulk of liquor in the precipitator, without having any substantial proportion thereof thrown against the sides of the cooling tower, so that the spray of liquor has a free fall in the tower, and into the liquor in the precipitator. To accomplish this, I preferably make the velocity of the liquor striking against the spreader substantially uniform. For securing this result, I decrease the velocity at which the liquor impinges upon the saucer L for which result I employ a pipe O whose internal diameter is greater than the horizontal portion of the branch pipe S, it being understood that the elbow F is of substantially the same size as the pipe O. This construction is best adapted for a certain type of precipitators now in use, but if for any reason the size of the precipitator or of the pump or the height of the spray above the liquor or the height from the saucer L to the pipe O, be changed it might become necessary to substitute for the pipe O a pipe of some other diameter in order to give the desired velocity under the changed conditions. In other words, the size of the orifice through which the liquor is discharged to the saucer is adjusted to the proportions of the whole apparatus. Suffice it to say, after the discharge orifice has been selected of a sufficiently large size, the rate of cooling of the liquor is regulated by manipulating the valves H and I in the two branches of the pipe, as the principle of regulating the spray depends on the fact that the distance which the liquor will be thrown from the saucer varies with the velocity with which the liquor strikes the saucer.

The tower M may be supported above the precipitator by any suitable means, such as I-beams N located on the top of the precipitator. The use of the specific form of spray cup or distributer for the cooler herein described and shown removes the objection to the use of baffle plates or checkerwork which would soon become thickly coated with a hard scale of alumina, or alumina and soda, and necessitate frequent cleaning.

One of the difficulties encountered, in reintroducing the precipitated liquor at the top of the tank, resides in the fact, that owing to the viscuous properties of the solution, the same would foam and run over the upper edge of the container. To minimize this foaming of the liquor, according to the prior practice, the liquor carrying precipitated hydrate, withdrawn from the bottom of the tank, was discharged at the upper end thereof slightly below the upper surface of the liquor. I have ascertained, however, that by reintroducing the liquor carrying precipitated hydrate to the top of the column of the liquor as a disintegrated spray, that is in the form of fine particles, this difficulty of foaming is completely overcome. This is accomplished by the apparatus above described and illustrated in the accompanying drawing. An important feature of this invention resides in the fact that by breaking up the stream, before the same enters the column of liquor, into particles, and exposing the same to the atmospheric air, a sufficient cooling of the liquor and precipitated hydrate takes place to hasten to a maximum the precipitation of the aluminum hydrate from the liquor in the precipitator. Consequently, no additional means are required to effect the rate of cooling, as this may be done in two ways by the apparatus herein shown; first, and as before stated, controlling the flow of liquor and hydrate to the distributer by means of the valves H and I; and second, by locating the distributer farther from or nearer to the upper surface of the liquor column. The column of air in the tower serves, of course, as the cooling medium and the effect of raising and lowering the distributer will be obvious.

While the form of apparatus herein described is designed for cooling sodium aluminate liquor during the precipitation of alumina the invention is equally adapted for cooling other liquors. The arrangement of the spray cup so as to receive the liquid from a single pipe or nozzle without the necessity of using baffles, checker-work or other surfaces below the spray cup to spread the liquor makes it applicable for cooling any liquid containing solid matter which might clog small openings, or form a coating or crust on such baffles, checker-work or other surface. Furthermore the invention is admirably adapted to be used for cooling to the desired temperature any liquid which has viscous properties or any properties which would cause trouble by foaming when introduced or reintroduced into a column of liquor.

What I claim is:

1. An apparatus for cooling a fluent material, comprising, in combination, a deep open tank having means for conveying material from the bottom of the tank to a discharge point above the upper surface of the liquid therein, a distributer for breaking up the stream of liquid issuing from the conveying means into fine particles whereby the liquid is adapted to be cooled to the desired temperature by coming into contact with the air while said spray is passing from the distributer to the surface of the liquid in the tank, and means distinct from the tank for preventing the liquid spray from passing over the upper edge of the liquid tank.

2. In an apparatus for cooling a fluent material, a tank, means for conveying material from the bottom of the tank to the upper end thereof, and a distributer adapted to receive and spread at least a portion of the material from said conveying means, said distributer being located at a point above the surface of the liquid in the tank, said conveying means comprising means for controlling the velocity at which the material strikes said distributer, whereby substantially all of said flowing material is broken up into a spray which has a free fall into the main body of liquid in said tank.

3. In an apparatus for cooling a fluent material, a tank, a distributer located at a point above the surface of the liquid in the tank, and means for conveying material from the bottom of the tank to said distributer, the interior of said conveying means being enlarged at its end adjacent said distributer whereby the velocity at which the material strikes the plate is reduced.

4. An apparatus for treating liquid material, comprising a deep tank, means for withdrawing liquor from the lower part thereof, for elevating the same, and for reintroducing the same at the upper part thereof, a spray-producing means located some distance above the normal liquor level in the tank to allow cooling air to come into contact with the spray from said spray-producing means, and a branch connection for delivering a part of such reintroduced liquor directly to the liquor in the upper part of the tank and for delivering another part thereof to said spray-producing means.

In testimony whereof I affix my signature in the presence of two subscribing witnesses.

RALPH S. SHERWIN.

Witnesses:
C. E. HODGSON,
H. P. HELMER.